March 17, 1959
R. W. ANTHONY
2,877,658
COMPENSATED WORM, WORM GEAR DEVICE
Filed Feb. 11, 1957
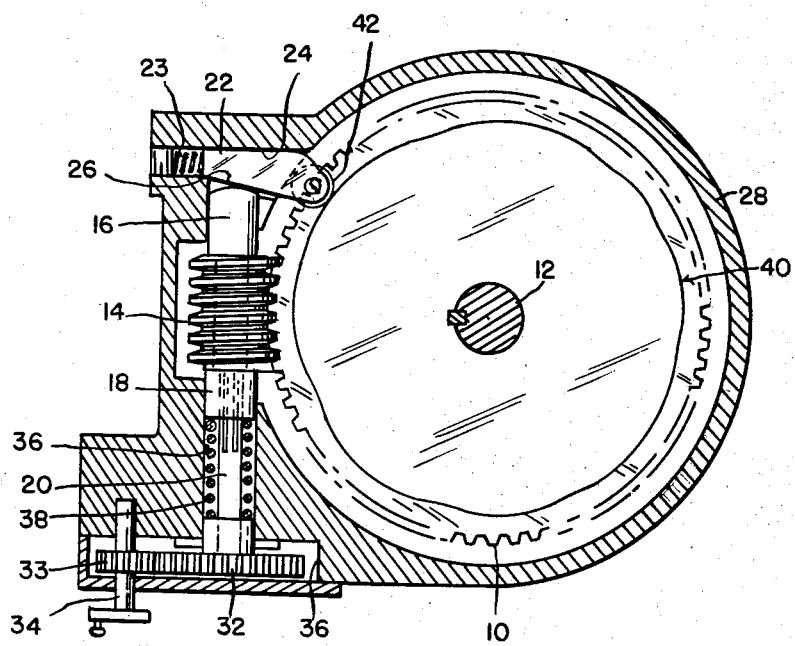
INVENTOR.
RUSSEL W. ANTHONY
BY
ATTORNEYS

2,877,658

COMPENSATED WORM, WORM GEAR DEVICE

Russel W. Anthony, Detroit, Mich., assignor to National Broach & Machine Company, Detroit, Mich., a corporation of Michigan Application February 11, 1957, Serial No. 639,378

7 Claims. (Cl. 74—409)

The present invention relates to a compensated worm, worm gear device.

It is an object of the present invention to provide indexing mechanism characterized by the accuracy of indexing movement obtainable thereby.

It is a further object of the present invention to provide indexing mechanism comprising operating elements, and cam means specifically formed to correct observed indexed errors associated therewith.

More specifically, it is an object of the present invention to provide indexing mechanism comprising a worm gear, a worm in mesh therewith, means mounting the worm gear for limited axial movement, a movable abutment engageable by one end of the worm, spring means urging the worm into engagement with said abutment, cam means rotatable with said worm gear having its surface shaped to correct observed index errors of said worm gear, and means interconnecting said cam and abutment.

Other objects and features of the invention will become apparent as the description proceeds, especially when taken in conjunction with the accompanying drawing, illustrating a preferred embodiment of the invention, wherein:

The figure is a diagrammatic view illustrating the indexing feature.

The problem of obtaining accurate indexed rotation of an index plate has long presented serious difficulties. One solution which has heretofore been proposed is to employ a worm gear as an index plate or to connect a worm gear to an index plate. A worm in mesh with the worm gear may then be given predetermined rotational movement which as a result of the ratio between the worm and worm gear should produce quite accurate movement of the index plate or worm gear. Thus for example, if the index plate is provided with 720 teeth and the worm is a single start worm, two complete rotations of the worm are required to produce an angular movement of the index plate one degree. In other words, a one percent error in location of the worm would theoretically result in an index error of only approximately twenty seconds of arc.

However, the theoretical accuracy of this arrangement has not in the past been borne out in practice, due primarily to the inability of the industry to produce completely accurate worms and worm gears.

The present invention provides simple means for employing a worm and worm gear of only commercial accuracy, if desired, in combination with means specifically designed to correct the observed errors resulting from operation of the particular worm and worm gear. This means essentially comprises cam means for effecting axial displacement of the worm in timed relation to rotation of the index plate or in increments depending upon the position of the index plate, so as to correct the existing errors traceable specifically to errors in the particular worm and/or worm gear.

In the drawing there is illustrated a worm gear 10 which may be an index plate or may be connected to an index plate by a shaft 12. The worm gear 10 has in meshing relation therewith a drive worm 14 including a first shaft projection 16 and a second shaft projection 18 splined or otherwise connected to a drive shaft 20. The projection 16 of the worm 14 engages a movable abutment 22 in the form of a wedge engaged by a compression spring 23 slidable longitudinally to the right as shown in a guideway 24 extending transversely of the axis of the worm 14. The wedge 22 includes a wedging surface 26 having an inclination, here shown greatly exaggerated, sufficient to provide the endwise movement of the worm required to effect true index rotation of the worm gear 10. The worm and worm gear are mounted in a housing 28 having a recess 30 therein for the reception of gearing such as change gearing including the gears 32 and 33. The input shaft 34 is associated with suitable drive mechanism for effecting a predetermined incremental rotation of the gear 32. The shaft 20 is received in an opening 36 in the housing receiving a compression spring 38, the strength of which is sufficient to maintain the worm 14 at all times against the wedge surface 26.

Connected to the worm gear 10 is a compensating plate or cam 40 having an edge surface engageable with a roller 42 carried by the wedge 22. The surface of the compensating plate or cam 40 engaged by the roller 42 is contoured in accordance with observed errors noted when the index plate is indexed by the worm 14 without allowing axial movement of the worm. The pattern of the edge contour will thus depend upon actual errors resulting from meshed rotation between the worm and worm gear. The depth or magnitude of the pattern will of course be a function of the angle of inclination of the wedge surface 26. The edge of the compensating plate may be accurately ground to the required contour after index errors have been noted for all positions during a complete rotation of the compensating plate.

So long as the errors resulting from the rotation of the index plate by rotation of the worm are constant, as will be the case if they are attributable only to errors in the teeth of the worm and worm gear, these errors may be completely eliminated by appropriate contouring of the compensating plate or cam 40.

The indexing mechanism disclosed herein may be operated in conjunction with a second axially shiftable worm in mesh with the worm gear which may be rotated generally synchronously with the worm 14 during rotation of the worm 14, but which will be given an endwise bias to apply a constant loading between the teeth of the worm 14 and worm gear 10 when the worm gear is to be retained by the worm in its indexed position.

The drawing and the foregoing specification constitute a description of the improved compensated worm, worm gear device in such full, clear, concise and exact terms as to enable any person skilled in the art to practice the invention, the scope of which is indicated by the appended claims.

What I claim as my invention is:

1. A compensated worm, worm gear device comprising a worm gear, a worm in mesh with said gear, means mounting said worm for limited axial movement, a movable abutment engaging one end of said worm, a spring urging said worm against said abutment, and cam means shaped in accordance with observed worm-worm gear errors operatively connected to said movable abutment to move said abutment in timed relation to rotation of said worm gear to shift said worm axially to compensate for such errors.

2. A compensated worm, worm gear device comprising a worm gear, a worm in mesh with said gear, means mounting said worm for limited axial movement, a movable abutment in the form of a wedge engaging one end of said worm and movable transversely thereof, a spring urging said worm against said abutment, and cam means shaped in accordance with observed worm-worm gear errors operatively connected to said movable abutment to move said abutment in timed relation to rotation of said worm gear to shift said worm axially to compensate for such errors.

3. A compensated worm, worm gear device comprising a worm gear, a worm in mesh with said gear, means mounting said worm for limited axial movement, a movable abutment engaging one end of said worm, a spring urging said worm against said abutment, a rotary cam concentric with said worm gear, movable therewith in rotation and shaped in accordance with observed worm-worm gear errors operatively connected to said movable abutment to move said abutment in timed relation to rotation of said worm gear to shift said worm axially to compensate for such errors.

4. Index mechanism comprising a worm gear, a worm in mesh therewith, means for effecting predetermined rotation of said worm to produce a small index rotation of said worm gear, means mounting said worm for limited axial movement, a movable abutment engaged by one end of said worm, spring means urging said worm into engagement with said abutment, a cam rotatable concentrically with said worm gear, means connecting said cam and abutment for movement of the abutment by said cam, said cam having its surface formed in accordance with observed index errors of said worm gear obtained without axial movement of said worm to apply corrective endwise movement to said worm.

5. Index mechanism comprising a worm gear, a worm in mesh therewith, means for effecting predetermined rotation of said worm to produce a small index rotation of said worm gear, means mounting said worm for limited axial movement, a movable abutment in the form of a wedge movable transversely of said worm engaged by one end of said worm, spring means urging said worm into engagement with said abutment, a cam rotatable concentrically with said worm gear, means connecting said cam and abutment for movement of the abutment by said cam, said cam having its surface formed in accordance with observed index errors of said worm gear obtained without axial movement of said worm to apply corrective endwise movement to said worm.

6. Apparatus for maintaining a uniform relationship between a pair of coacting rotating members one of which is provided with a thread-like formation which comprises means for mounting said one member for axial movement, a cam secured for rotation with said other member, and means operatively connecting said cam and said one member to effect axial movement of said one member during rotation to preserve the required uniform relationship between said members during simultaneous rotation thereof, said last means comprising resilient means biasing said one member in a direction effective to maintain the means connecting the cam and said one member in pressure contact with the periphery of said cam.

7. Index mechanism comprising a worm gear, a worm in mesh therewith, means for effecting predetermined rotation of said worm to produce a small index rotation of said worm gear, means mounting said worm for limited axial movement, a cam rotatable concentrically with said worm gear, a cam follower engageable with the periphery of said cam, said cam having its surface formed in accordance with observed index errors of said worm gear obtained without axial movement of said worm, and means connecting said cam follower to said worm to effect axial movement thereof to apply corrective endwise movement to said worm whereby predetermined rotation of said worm while in mesh with any portion of the periphery of said worm gear will produce identical angular movement of said worm gear.

References Cited in the file of this patent

UNITED STATES PATENTS

| | | |
|---|---|---|
| 1,234,771 | Kiewicz | July 31, 1917 |
| 2,098,132 | Buckholz | Nov. 2, 1937 |